United States Patent
Xiong et al.

(10) Patent No.: US 12,397,233 B2
(45) Date of Patent: Aug. 26, 2025

(54) METHOD FOR TRAINING MODEL IN VIRTUAL ENVIRONMENT, MEDIUM, AND ELECTRONIC DEVICE

(71) Applicant: Shanghai Lilith Technology Corporation, Shanghai (CN)

(72) Inventors: Xin Xiong, Shanghai (CN); Haonan Zhao, Shanghai (CN); Huanhua Liao, Shanghai (CN); Zhikai Li, Shanghai (CN); Junfeng Li, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 0 days.

(21) Appl. No.: 18/837,753

(22) PCT Filed: Mar. 10, 2022

(86) PCT No.: PCT/CN2022/080137
§ 371 (c)(1),
(2) Date: Aug. 12, 2024

(87) PCT Pub. No.: WO2023/168653
PCT Pub. Date: Sep. 14, 2023

(65) Prior Publication Data
US 2025/0108301 A1 Apr. 3, 2025

(51) Int. Cl.
*A63F 13/56* (2014.01)
*G06N 20/00* (2019.01)

(52) U.S. Cl.
CPC ............ *A63F 13/56* (2014.09); *G06N 20/00* (2019.01)

(58) Field of Classification Search
CPC ...... G06N 5/022; G06N 3/006; A63F 13/422; A63F 13/45; A63F 13/50; A63F 13/52;
(Continued)

(56) References Cited

U.S. PATENT DOCUMENTS

2020/0306638 A1* 10/2020 Fear .................. A63F 13/56
2020/0410241 A1* 12/2020 Sundareson ............ A63F 13/44
(Continued)

FOREIGN PATENT DOCUMENTS

CN 110882544 A 3/2020
CN 110930483 A 3/2020
(Continued)

OTHER PUBLICATIONS

International Search Report; China National Intellectual Property Administration; International Application No. PCT/CN2022/080137; Oct. 12, 2022; 5 pages, including English translation.
(Continued)

*Primary Examiner* — Omkar A Deodhar
(74) *Attorney, Agent, or Firm* — Taft Stettinius & Hollister LLP

(57) ABSTRACT

A method for training a model in a virtual environment, a medium, an electronic device, and a computer program product. The method includes: an obtaining step, obtaining one or more initial parameters of each of one or more agents in the virtual environment, and causing each of one or more agents to generate one or more actions; an updating step, causing each agent to simultaneously perform the one or more actions in the virtual environment, so as to calculate, for each agent, one or more parameter variations that are respectively in one-to-one correspondence with the one or more initial parameters, and updating, based on the one or more initial parameters and the one or more parameter variations, to obtain one or more subsequent parameters of each agent in the virtual environment. It enhances scalability and reusability of simulating a game environment, increases the speed of simulating the game environment, and overall reduces the simulation time.

14 Claims, 8 Drawing Sheets

(58) Field of Classification Search
CPC .......... A63F 13/55; A63F 13/70; A63F 13/73; G05D 2101/10; G05D 1/0088; G06F 2221/2109

See application file for complete search history.

(56) References Cited

U.S. PATENT DOCUMENTS

| | | | | |
|---|---|---|---|---|
| 2021/0132688 | A1* | 5/2021 | Kim | H04N 19/164 |
| 2021/0406697 | A1* | 12/2021 | Kothari | G06N 3/047 |
| 2022/0008824 | A1* | 1/2022 | Kothari | G06N 3/088 |
| 2022/0180602 | A1* | 6/2022 | Hao | G06T 11/00 |
| 2023/0237352 | A1* | 7/2023 | Lan | G06N 3/092 |
| | | | | 706/12 |
| 2023/0351217 | A1* | 11/2023 | Gelfenbeyn | A63F 13/355 |

FOREIGN PATENT DOCUMENTS

| | | |
|---|---|---|
| CN | 111589157 A | 8/2020 |
| CN | 112476424 A | 3/2021 |

OTHER PUBLICATIONS

Written Opinion; China National Intellectual Property Administration; International Application No. PCT/CN2022/080137; Oct. 12, 2022; 7 pages, including English machine translation.

\* cited by examiner

Use one or more initial parameters of each agent, a corresponding action in a historical action sequence, and one or more initial state features of a virtual environment as input of a second model, and use one or more subsequent parameters of each agent and one or more subsequent state features of the virtual environment as a label of the second model, to perform deep learning, so as to obtain a second training model, the corresponding action is an action performed by each agent under the one or more initial parameters ⸺ S501

FIG. 5

METHOD FOR TRAINING MODEL IN VIRTUAL ENVIRONMENT, MEDIUM, AND ELECTRONIC DEVICE

CROSS-REFERENCE TO RELATED APPLICATIONS

This application is a U.S. National Phase of International PCT Application No. PCT/CN2022/080137, which was filed on Mar. 10, 2022, the contents of which are incorporated herein by reference in its entirety.

TECHNICAL FIELD

The present disclosure relates to a technical field of data processing, in particular to, a method for training a model in a virtual environment, a medium, an electronic device, and a computer program product.

BACKGROUND

In a video game in which multiple game characters are involved, in addition to a game character controlled by a real player, artificial intelligence (AI) supported by a computer can control a behavior of the game character. Control logic of the artificial intelligence (AI) is usually trained by a machine learning algorithm, and especially, is trained by a reinforcement learning (RL) algorithm. In reinforcement learning (RL), an agent is usually trained to control a behavior of the game character, and a training process is implemented mainly by causing the agent to interact with a game environment. At present, a computation process of the interaction between the agent and the game environment is mainly implemented on a CPU. However, when the number of agents increases, this manner in which computation is implemented based on the CPU faces the following problems: Because computation of each agent requires an independent thread to support, the number of agents that are simulated at the same time is limited by the number of CPU cores and the number of threads: hyper-thread leads to frequency reduction, and a simulation speed is reduced: scalability is lacked. In addition, it is laborious and time-consuming to build a complete game environment, and how to build a simulation game environment to improve overall training efficiency is also a problem that needs to be solved.

SUMMARY

Embodiments of the present disclosure provide a method for training a model in a virtual environment, a medium, an electronic device, and a computer program product.

According to a first aspect, an embodiment of the present disclosure provides a method for training a model in a virtual environment, used for an electronic device, and the method includes: an obtaining step, obtaining one or more initial parameters of each of one or more agents in an initial state in the virtual environment, and causing each agent to generate one or more actions; and an updating step, causing each agent to perform the one or more actions in the virtual environment, so as to calculate, for each agent, one or more parameter variations that are respectively in one-to-one correspondence with the one or more initial parameters, and updating, based on the one or more initial parameters and the one or more parameter variations, to obtain one or more subsequent parameters of each agent in a subsequent state in the virtual environment.

In a possible implementation of the first aspect, in the updating step, for each agent, after one or more actions associated with the same initial parameter are performed, the parameter variation corresponding to the same initial parameter is calculated.

In a possible implementation of the first aspect, for each agent, when a first initial parameter is associated with a second initial parameter, a parameter variation corresponding to the first initial parameter is calculated based on a parameter variation corresponding to the second initial parameter.

In a possible implementation of the first aspect, the one or more actions associated with the same initial parameter are actions performed by different agents.

In a possible implementation of the first aspect, the updating step is performed on a graphics processing unit, multiple threads are performed in parallel on the graphics processing unit, and each thread calculates a parameter variation and a subsequent parameter corresponding to each initial parameter.

In a possible implementation of the first aspect, one or more threads updating one or more initial parameters of the same agent form a thread block, each thread block is associated with a corresponding agent, and the multiple thread blocks form a grid corresponding to the virtual environment.

The same element content in multiple different virtual environments is stored as static data, and the one or more initial parameters and the one or more subsequent parameters of each agent are stored as dynamic data, and multiple different grids share the static data to be used by each thread in each grid.

In a possible implementation of the first aspect, the obtaining step and the updating step are repeatedly performed, one or more initial parameters of each agent obtained each time and one or more subsequent parameters obtained by updating are stored as a historical parameter sequence of each agent.

In a possible implementation of the first aspect, in the obtaining step, one or more initial state features of the virtual environment are further obtained, and in the updating step, one or more subsequent state features of the virtual environment are further obtained by updating, where the method further comprising: a first training step, using the one or more initial parameters of each agent, the one or more subsequent parameters of each agent, the one or more initial state features of the virtual environment, and the one or more subsequent state features of the virtual environment as input of a first model, and using the one or more actions as a label of the first model, to perform deep learning, so as to obtain a first training model; and an action derivation step, inputting the historical parameter sequence of each agent into the first training model, so as to obtain a historical action sequence of each agent.

In a possible implementation of the first aspect, the method further comprising:

a second training step, using the one or more initial parameters of each agent, a corresponding action in the historical action sequence, the one or more initial state features of the virtual environment as input of a second model, and using the one or more subsequent parameters of each agent and the one or more subsequent state features of the virtual environment as a label of the second model, to perform deep learning, so as to obtain a second training model, wherein, the corresponding action is an action executed by each agent under the one or more initial parameters.

In a possible implementation of the first aspect, the one or more agents are caused to interact in the virtual environment or the second training model.

In a possible implementation of the first aspect, in the obtaining step, one or more initial state features of the virtual environment are further obtained, and in the updating step, one or more subsequent state features of the virtual environment are further obtained by updating, the method further comprising: a third training step, using the one or more initial parameters of each agent, the one or more actions of each agent, and the one or more initial state features of the virtual environment as input of a third model, and using the one or more subsequent parameters of each agent and the one or more subsequent state features of the virtual environment as a label of the third model, to perform deep learning, so as to obtain a third training model.

In a possible implementation of the first aspect, the one or more agents are caused to interact in the virtual environment or the third training model.

In a possible implementation of the first aspect, the virtual environment is a game environment, and the one or more agents are corresponding to one or more game characters in the game environment.

According to a second aspect, an embodiment of the present disclosure provides a computer program product, including a computer-executable instruction, and the instruction is executed by a processor to implement the method for training a model in a virtual environment according to the first aspect.

According to a third aspect, an embodiment of the present disclosure provides a computer-readable storage medium having stored therein instructions configured to, when executed on a computer, cause the computer to perform the method for training a model in a virtual environment in the first aspect.

According to a fourth aspect, an embodiment of the present disclosure provides an electronic device, including: one or more processors; and one or more memories: wherein, one or more programs are stored in the one or more memories, and when the one or more programs are executed by the one or more processors, the electronic device is caused to perform the method for training a model in a virtual environment according to the first aspect.

According to a fifth aspect, an embodiment of the present disclosure provides an apparatus for training a model in a virtual environment, and the apparatus includes: an obtaining unit, configured to obtain one or more initial parameters of each of one or more agents in an initial state in the virtual environment, and cause each agent to generate one or more actions; and an updating unit, configured to cause each agent to perform one or more actions in the virtual environment, so as to calculate, for each agent, one or more parameter variations that are respectively in one-to-one correspondence with the one or more initial parameters, and updating, based on the one or more initial parameters and the one or more parameter variations, to obtain one or more subsequent parameters of each agent in a subsequent state in the virtual environment. The above obtaining unit and the updating unit may be implemented by a processor in the electronic device which has the functions of those modules or units.

In the present disclosure, in a process of continuous interaction between the agents and the game environment, scalability and reusability of simulating the game environment are enhanced by using a parameter variation corresponding to each parameter. Furthermore, because the game environment is simulated on a GPU, when the number of agents increases, the simulation is not limited by the number of cores, the number of threads, and bandwidth of the CPU. Moreover, the GPU can execute multiple threads in parallel, so that processing complexity is reduced. Therefore, a speed of simulating the game environment can be improved, and the overall simulation time is reduced. Further, in the present disclosure, only one piece of static data needs to be stored, and the requirement for space of a display memory in GPU is reduced. In addition, the method of maintaining independent dynamic data on the basis of sharing static data is used, so that the agent may further consider the relationship with other agents, for example, to prevent clipping through of the agent, while the agent interacts with the game environment. Further, in the present disclosure, an action that causes a parameter variation (that is, an action of a game character) can be derived without additional information by using parameters in a current state and parameters in a next state, so that the agent of a game of state synchronization has historical actions, and communication overhead and delay for the server to transmit additional information to a playback server are reduced. Further, in the present disclosure, the agent is trained in the trained game environment model, and therefore, a training speed of the agent can be improved.

BRIEF DESCRIPTION OF DRAWINGS

FIG. 5 is a flowchart of further simulating a game environment in a game of state synchronization according to some embodiments of the present disclosure:

DETAILED DESCRIPTION OF EMBODIMENTS

Explanation embodiments of the present disclosure include but are not limited to a method for training a model in a virtual environment, a medium, an electronic device, and a computer program product.

The embodiments of the present disclosure are further described in detail below with reference to the accompanying drawings.

Figure 1:
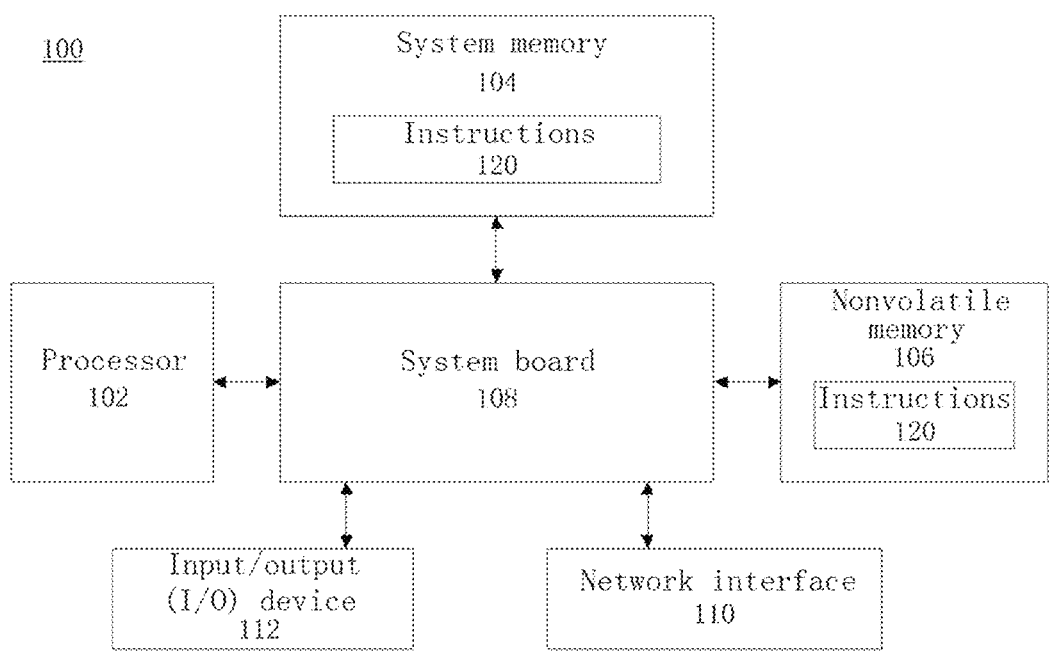
FIG. 1 is a block diagram of an electronic device according to some embodiments of the present disclosure.

FIG. 1 is a block diagram of an electronic device according to some embodiments of the present disclosure.

As shown in FIG. 1, an electronic device 100 may include one or more processors 102, a system board 108 connected to at least one of the processors 102, a system memory 104 connected to the system board 108, a nonvolatile memory (NVM) 106 connected to the system board 108, and a network interface 110 connected to the system board 108.

The processor 102 may include one or more single-core or multi-core processors. The processor 102 may include any combination of a general purpose processor (such as CPU) and a special-purpose processor (such as, a graphics processing unit, an application processor, or a baseband processor). The graphics processing unit (graphics processing unit, GPU) is a special-purpose processor, and has a higher order of magnitude of cores and a powerful parallel computing capability relative to a general purpose processor, and is widely used in computer graphics processing. In an embodiment of the present disclosure, the processor 102 may be configured to perform one or more of the various embodiments shown in FIG. 2.

In some embodiments, the system board 108 may include any suitable interface controller (not shown in FIG. 1), to provide any suitable interface for at least one of the processors 102 and/or any suitable device or component communicating with the system board 108.

In some embodiments, the system board 108 may include one or more memory controllers to provide an interface connected to the system memory 104. The system memory 104 may be used to load and store data and/or an instruction 120. In some embodiments, the system memory 104 of the electronic device 100 may include any suitable volatile memory, such as a suitable dynamic random access memory (DRAM).

The nonvolatile memory 106 may include one or more tangible and non-transitory computer-readable media for storing data and/or the instruction 120. In some embodiments, the nonvolatile memory 106 may include any suitable nonvolatile memory such as a flash memory and/or any suitable nonvolatile storage device, such as a HDD (Hard Disk Drive,), a CD (Compact Disc) drive, a DVD (Digital Versatile Disc) drive.

The nonvolatile memory 106 may include a portion of storage resources installed on the apparatus of the electronic device 100, or may be accessed by an external device, but is not necessarily part of an external device. For example, the nonvolatile memory 106 may be accessed over a network via the network interface 110.

In particular, the system memory 104 and the nonvolatile storage 106 may respectively include: a temporary copy and a permanent copy of the instruction 120. The instruction 120 may include: an instruction that causes the electronic device 100 to implement the method shown in FIG. 2 when executed by at least one of the processors 102. In some embodiments, the instruction 120, hardware, firmware, and/or software components thereof may additionally/alternatively reside in the system board 108, the network interface 110, and/or the processor 102.

The network interface 110 may include a transceiver for providing a radio interface for the electronic device 100 to communicate with any other suitable devices (such as, a front-end module and an antenna) by using one or more networks. In some embodiments, the network interface 110 may be integrated with other components of the electronic device 100. For example, the network interface 110 may be integrated into at least one of the processors 102, the system memory 104, the nonvolatile memory 106, and a firmware device (not shown) having an instruction, and when at least one of the processors 102 executes the instruction, the electronic device 100 implements one or more of the various embodiments shown in FIG. 2.

The network interface 110 may further include any suitable hardware and/or firmware to provide a multiple-input multiple-output wireless interface. For example, the network interface 110 may be a network adapter, a wireless network adapter, a telephone modem, and/or a wireless modem.

In one embodiment, at least one of the processors 102 may be packaged with one or more controllers used for the system board 108 to form a system in a package (SiP). In one embodiment, at least one of the processors 102 may be integrated on the same die with one or more controllers used for the system board 108 to form a system on a chip (SoC).

The electronic device 100 may further include: an input/output (I/O) device 112 connected to the system board 108. The I/O device 112 may include a user interface, so that a user can interact with the electronic device 100; peripheral components can also interact with the electronic device 100 by using a design of a peripheral component interface. In some embodiments, the electronic device 100 further includes a sensor for determining at least one of environmental conditions and location information related to the electronic device 100.

In some embodiments, the I/O device 112 may include, but is not limited to, a display (such as, a liquid crystal display and a touch screen display), a speaker, a microphone, one or more cameras (such as, a still image camera and/or a video camera), a flashlight (such as, a LED flash), a keyboard, and a graphics card. The graphics card is composed of a graphics processing unit integrated with an I/O interface (such as, a PCIE interface) conforming to the Data Transport Protocol Specification.

In some embodiments, the peripheral component interface may include, but is not limited to, a nonvolatile memory port, an audio jack, and a power interface.

In some embodiments, the sensor may include, but is not limited to, a gyroscope sensor, an accelerometer, a proximity sensor, an ambient light sensor, and a positioning unit. The positioning unit may also be part of or interact with the network interface 110 to communicate with a component of the positioning network (such as, Global Positioning System (GPS) satellites).

It can be understood that, the structure illustrated in the embodiment of the present disclosure does not constitute a specific limitation on the electronic device 100. In other embodiments of the present disclosure, the electronic device 100 may include more or fewer components than those shown in the figure, or combine some components, or split some components, or have different component arrangements. The illustrated components may be implemented in hardware, software, or a combination of software and hardware.

Program code can be applied to input instructions to perform the functions described herein and to generate output information. The output information may be applied to one or more output devices in a known manner. For purposes of the present disclosure, a system used for processing the instructions and including the processor 102 includes any system with a processor such as a digital signal processor (DSP), a microcontroller, an application specific integrated circuit (ASIC), or a microprocessor.

The program code can be implemented in a high-level programming language or an object-oriented programming language to communicate with a processing system. The program code can also be implemented in an assembly language or a machine language, if desired. In fact, the mechanism described in the present disclosure is not limited in scope to any particular programming language. In either case, the language may be an assembly language or an interpreted language.

One or more aspects of at least one embodiment can be implemented by an instruction stored on a computer-readable storage medium, and when the instruction is read and executed by a processor, the electronic device can implement the methods of the embodiments described in the present disclosure.

The method for training a model in a virtual environment provided in the present disclosure can be applied to the electronic device 100 shown in FIG. 1, and the electronic device 100 is, for example, the server 100.

Figure 2:
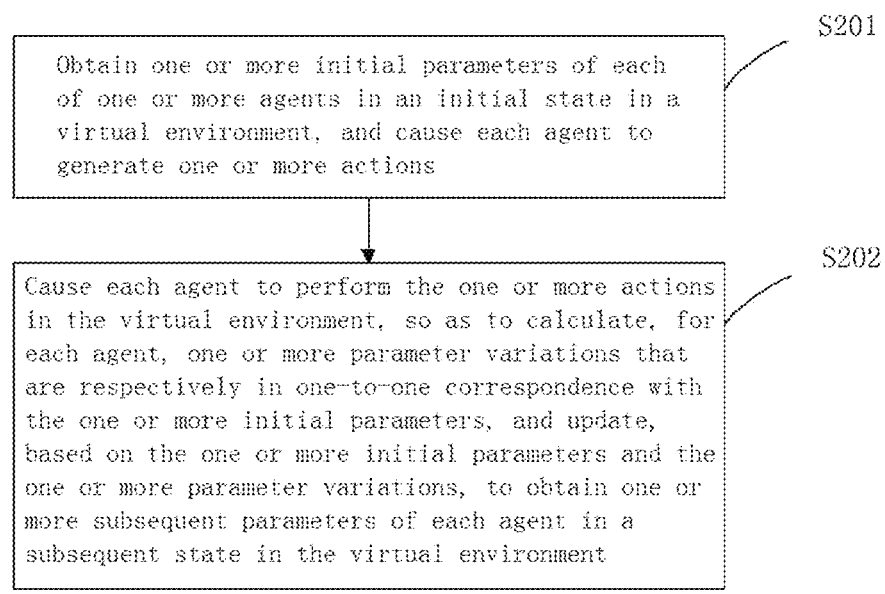
FIG. 2 is a flowchart of a method for training a model in a virtual environment according to some embodiments of the present disclosure.

As shown in FIG. 2, FIG. 2 is a flowchart of a method for training a model in a virtual environment according to an embodiment of the present disclosure.

In an obtaining step S201, a processor 102 in a server 100 obtains one or more initial parameters of each of one or more agents trained by reinforcement learning in an initial state in the virtual environment, and causes each agent to generate one or more actions. In this embodiment, the initial parameters are obtained by a general purpose processor (such as a CPU) included in the processor 102.

Figure 8:
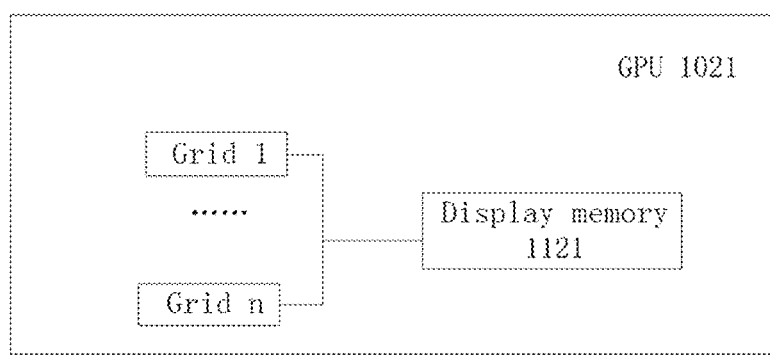
FIG. 8 is a schematic diagram of a GPU according to some embodiments of the present disclosure.

It can be understood that after the CPU obtains the initial parameters, the obtained initial parameters are provided for a GPU included in the processor 102. FIG. 8 is a schematic diagram of a GPU 1021 according to this embodiment.

Further, in this embodiment, the virtual environment is, such as, a game environment, one or more agents are corresponding to one or more game characters controlled by artificial intelligence in the game environment. The agents can be agents trained by the reinforcement learning. For example, the agents are trained by the reinforcement learning based on preset game policies and rules and a large number of real game parameters.

In this embodiment, three agents are used as an example for illustration. However, it should be understood that the number of agents is not limited and can be arbitrary. For example, at a time t0, each agent has one or more initial parameters in an initial state in the game environment. In this embodiment, the game environment is, such as, a competitive game environment, more specifically, such as, a shooting game environment. In the shooting game environment, these parameters are, such as a location (loc) and a health point (HP) of the agent in the game environment. For an agent1, it has initial parameters, for example, $loc_1^{t0}$ and $HP_1^{t0}$. Similarly, for an agent2, it has initial parameters, for example, $loc_2^{t0}$ and $HP_2^{t0}$. For an agent3, it has initial parameters, for example, $loc_3^{t0}$ and $HP_3^{t0}$. It can be understood that the location (loc) can be represented by using coordinates (x, y) in the game environment. All initial parameters of the same agent constitute an initial state of the agent in the game environment. It can be understood that, for the agent, all parameters at any time constitute a state at that time, that is, all the initial parameters at an initial time constitute the initial state, and all subsequent parameters at a subsequent time constitute a subsequent state.

In addition, in the obtaining step S201, the above CPU is used to cause each agent to generate one or more corresponding actions according to a predetermined policy.

Each agent generates one or more actions at a time t0 according to a predetermined policy (policy). Here, each agent has a corresponding policy. If the policies are different, the actions generated by the agents may be different. Therefore, the actions generated by different agents can be the same or different. It can be understood that the policy of each agent is preset and is the same as that in the prior art. Therefore, details are not described herein.

It can be understood that the preset policy is the code of conduct for the agent, and is a policy in reinforcement learning in this embodiment. The predetermined policy is used to cyclically generate an action in the entire game process according to parameters in a game state at a current time, and the agent performs the action generated by using the predetermined policy to interact with the game environment. Subsequently, the game environment transmits, parameters of the agent in a next state after the action is performed, to the agent.

In addition, it can be understood that, as a substitute, the above GPU 1021 can be used to cause each agent to generate one or more corresponding actions according to the predetermined policy.

In this embodiment, an action generated by the agent1 is, for example, move1, and an action generated by the agent2 is, for example, fire2, and an action generated by the agent3 is, for example, aid3. For example, move1 indicates that it makes the agent1 move a distance d1, fire2 indicates that it makes the agent2 shoot towards the agent1, and aid3 indicates that the agent3 presents a health pack to the agent1.

In an updating step S202, the processor 102 in the server 100 causes each agent to perform one or more actions in the virtual environment, so as to calculate, for each agent, one or more parameter variations that are respectively in one-to-one correspondence with the one or more initial parameters, and update, based on the one or more initial parameters and the one or more parameter variations, to obtain one or more subsequent parameters of each agent in a subsequent state in the virtual environment.

Specifically, for each agent, after one or more actions associated with the same initial parameter are performed, the parameter variation corresponding to the same initial parameter is calculated. It can be understood that each initial parameter of each agent has a corresponding parameter variation.

Details are described below with reference to FIG. 3. For example, after the action move1 associated with the initial parameter $loc_1^{t0}$ of the agent1 is performed, a parameter variation1 corresponding to $loc_1^{t0}$ is calculated. It can be understood that an action associated with the initial parameter $loc_1^{t0}$ of the agent refers to an action that affects (that is, changes) the initial parameter $loc_1^{t0}$.

After the agent1 performs the action move1, that is, after the agent1 moves the distance d1, the parameter variation1 is calculated. The parameter variation1 is, for example, a distance (Distance) between the agent and another agent (for example, the agent2 or the agent3). Here, the parameter variation1 can be expressed by the following formula 1:

$$\text{Parameter variation1(Distance)} = f(\text{move1}) \qquad \text{Formula 1}$$

In addition, after actions fire2 and aid3 associated with the initial parameter $HP_1^{t0}$ of the agent1 are performed, a parameter variation2 corresponding to $HP_1^{t0}$ is calculated. It can be understood that an action associated with the initial parameter $HP_1^{t0}$ of the agent refers to an action that affects (that is, changes) the initial parameter $HP_1^{t0}$. In addition, it can be understood that multiple actions associated with the same initial parameter may be actions performed by different agents. For example, the action fire2 is performed by the agent2, and aid3 is performed by the agent3.

Further, for each agent, when the first initial parameter is associated with the second initial parameter, a parameter variation corresponding to the first initial parameter is calculated based on a parameter variation corresponding to the second initial parameter.

For example, for the agent1, when the first initial parameter $HP_1^{t0}$ is associated with the second initial parameter $loc_1^{r0}$, a parameter variation 2 corresponding to $HP_1^{r0}$ is calculated based on the parameter variation 1 corresponding to $loc_1^{r0}$. Here, the first initial parameter $HP_1^{r0}$ being associated with the second initial parameter $loc_1^{r0}$ indicates that after the agent2 performs the action fire2, the parameter variation 1 of $loc_1^{r0}$ needs to be called to calculate the parameter variation 2 of $HP_1^{r0}$. It can be understood that the parameter variation 1 of the second initial parameter $loc_1^{r0}$ is affected by the action move1, and therefore, the parameter variation 2 of the first initial parameter $HP_1^{r0}$ being affected by the action fire2 indicates that the parameter variation 2 is affected by both the action move1 and the action fire2. It can be understood that the actions move1 and fire2 performed for the same agent (for example, the agent1) are associated.

It can be understood that the parameter variation corresponding to the same initial parameter of the same agent is affected by different actions of different agents. In this embodiment, the parameter variation 2 corresponding to the first initial parameter $HP_1^{r0}$ of the agent2 is affected by the above actions move1, fire2 and aid3. Therefore, based on the parameter variation 1 (Distance), a part of the parameter variation 2 (g (f, fire2) shown in the following formula 2) after performing fire2 is calculated, and another part of the parameter variation 2 ($\Delta HP3$ shown in the following formula 2) after performing aid3 is calculated. The parameter variation 2 is, for example, a variation $\Delta HP$ of the health point of the agent1 after the actions move1, fire2 and aid3 are performed. Here, the parameter variation 2 can be expressed by the following formula 2:

$$\text{Parameter variation 2 } (\Delta HP) = g(f, \text{fire2}) + \Delta HP3 \qquad \text{Formula 2}$$

Here, $\Delta HP3$ is the health point $\Delta HP3$ that the agent3 presents to the agent1 after the agent3 performs the action aid3 on the agent1. A function g indicates a variation of the health point generated after the agent2 performs the action "fire2" on the agent1. It can be learned that the function g calls a function f in formula 1. That is, the parameter variation 2 is calculated based on the parameter variation 1.

As described above, the parameter variation 1 and the parameter variation 2 are calculated. Then, according to the parameter variation 1 and the initial parameter $loc_1^{r0}$, a subsequent parameter, for example, a parameter $loc_1^{r1}$ at a time t1, related to the second initial parameter of the agent1 in the game environment is calculated. Similarly, according to the parameter variation 2 and the initial parameter $HP_1^{r0}$, a subsequent parameter, for example, a parameter $HP_1^{r1}$ at a time t1, related to the first initial parameter of the agent1 in the game environment is calculated.

Specifically, for example, according to the initial parameter $loc_1^{r0}$ (such as coordinates $(x_1^{r0}, y_1^{r0})$) and the distance (Distance) between the agent1 and the agent2, and distance (Distance) between the agent1 and the agent3 (that is, the parameter variation 1), a location $loc_1^{r1}$ (for example, coordinates $(x_1^{r1}, y_1^{r1})$) of the agent1 at a time t1 is calculated. Similarly, the health point $HP_1^{r1}$ of the agent1 at a time t1 can be calculated according to the initial parameter $HP_1^{r0}$ and $\Delta HP$. A specific calculation method can be defined according to different initial parameters. For example, the calculation can be performed by using any appropriate function without any limitation.

Similarly, for the agent2 and the agent3, a corresponding first subsequent parameter and a corresponding second subsequent parameter are calculated by using the similar method above, for example, parameters $HP_2^{r1}$, $loc_2^{r1}$ of the agent2 at a time t1, and parameters $HP_2^{r1}$, $loc_3^{r1}$ of the agent3 at a time t1.

Figure 3:
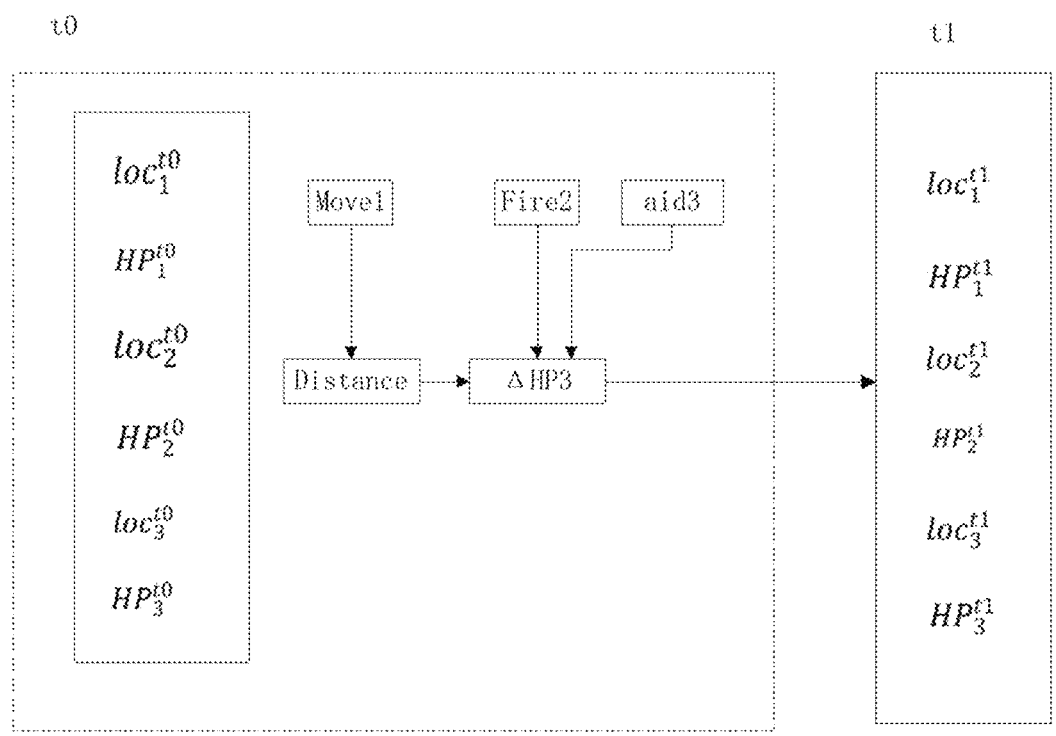
FIG. 3 is a schematic diagram of updating initial parameters of multiple agents to subsequent parameters according to some embodiments of the present disclosure.

It can be understood that, as an example, only two initial parameters and two subsequent parameters of each of the three agents in this embodiment are shown in FIG. 3, and the number of agents and the number of parameters of each agent can be arbitrary without limitation.

It can be learned from the above formula 1 and formula 2 that the parameter variation 1, that is, the function f, is called when the parameter variation 2 is calculated. Therefore, when the parameter variation 2 is calculated, the parameter variation 1 does not need to be repeatedly calculated for the action move1, and only the previously calculated parameter variation 1 needs to be called. In addition, if the function f changes, it is only necessary to substitute a new function f into formula 2 to calculate the parameter variation 2, and it is not necessary to redesign the function g. Therefore, in the process of continuous interaction between the agent and the game environment, scalability and reusability for simulating game environment are enhanced by using the parameter variation corresponding to each parameter. In addition, it can be understood that the actions of the agent1, the agent2, and the agent3 are performed simultaneously, and the parameter variation 1 and the parameter variation 2 are calculated after all actions are performed.

Further, the updating step S202 is performed on the graphics processing unit (GPU) 1021, that is, the GPU 1021 performs a process of updating parameters. Multiple threads are executed in parallel on the GPU 1021, and each thread calculates a parameter variation and a subsequent parameter corresponding to each initial parameter of each agent.

Figure 9:
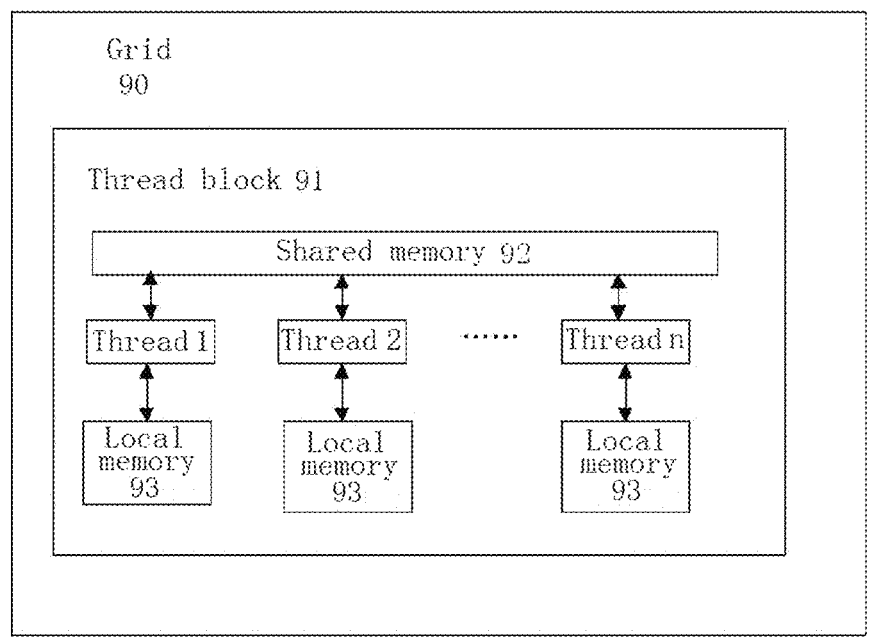
FIG. 9 is a schematic diagram of a grid in FIG. 8 according to some embodiments of the present disclosure.

As shown in FIG. 8, the GPU 1021 includes multiple grids, such as grid 1 . . . grid n, and includes a display memory 1121 shared by all the grids. FIG. 9 is a schematic diagram of a grid in FIG. 8. It can be understood that structures of the grids in FIG. 8 are all the same.

As shown in FIG. 9, the grid 90 includes multiple thread blocks 91 (block). As an example, only one thread block 91 is shown in FIG. 9. It can be understood that the number of thread blocks 91 can be arbitrary without limitation. As shown in FIG. 9, the thread block 91 includes a shared memory 92, multiple threads (thread 1, thread 2 . . . thread n), and local memories 93 that are in one-to-one correspondence with respective threads.

It can be understood that many parallelized lightweight threads run on the GPU 1021, and the multiple threads are executed in parallel by using a kernel function supported by the GPU 1021, that is, the kernel function can simultaneously execute the multiple threads on the GPU 1021. The kernel function is a commonly used kernel function in the field of machine learning and is mastered by a person skilled in the art. The multiple threads can form a thread block, the multiple thread blocks form a grid, and the multiple grids form all threads on the GPU 1021.

One or more threads updating one or more initial parameters of the same agent form a block, each block is associated with a corresponding agent, and multiple blocks form a grid corresponding to the game environment.

It can be understood that a grid is corresponding to a game session (that is, a game environment), different thread blocks in the same grid are corresponding to different agents in the same game session, and different threads in the same block are corresponding to different parameters of the same agent.

Each thread computes a parameter variation corresponding to an initial parameter at a time t0 and a subsequent parameter at a time t1.

Specifically, after the agent1, the agent2, and the agent3 simultaneously perform all actions, for example, thread 1 calculates to obtain the parameter variation 1 and $loc_1^{t2}$ corresponding to $loc_1^{t0}$ of the agent1, and thread 2 calculates to obtain the parameter variation 2 and $HP_1^{t2}$ corresponding to $HP_1^{t0}$ of the agent1. Similarly, other threads perform similar computations for other agents.

According to the existing processor performance, there are generally dozens of cores of the CPU of the server 100, while the number of cores of the GPU can reach tens of thousands. With regard to the orders of magnitude of dozens of agents in the game environment, even if multiple game environments are simultaneously run, the GPU still has an ability to allocate a thread for each parameter of each agent. In the present disclosure, it causes the agents to interact in the game environment on the GPU, that is, it is computed for an action execution and parameter variation process of the agent according to a predetermined policy, and therefore, the computation is not limited by the number of cores of the CPU, the number of threads, and bandwidth when the number of agents increases. Moreover, compared with the prior art that the sequence logic and data relationship of execution needs to be arranged when the threads corresponding to all agents are calculated by using the CPU, the GPU can execute multiple threads in parallel, so that processing complexity is reduced. Therefore, the speed of simulating the game environment can be improved, and the overall simulation time is reduced.

It can be understood that, when the same task is run, a running speed on a single CPU core is about 5-50 times of a running speed on a single GPU core, and therefore the speed of running the same task on a GPU with 10000 cores should be about 200-2000 times of the speed of running the task on a single CPU.

Further, the same element content in multiple different game environments is stored as static data, and one or more initial parameters and one or more subsequent parameters of each agent are stored as dynamic data. That is, multiple different grids share the static data to be used by each thread in each grid.

Specifically, in the present disclosure, data participating in computing by the GPU is divided into static data and dynamic data. The static data is, for example, map information shared in different grids (game sessions), that is, shared data in multiple game sessions, and does not change with the game process. The dynamic data includes different parts in different game sessions, that is, data that changes with the game process, such as a location, a health point (HP), a weapon and other data of each agent in the game session.

The agent moves on a map of a game. For example, there are some obstacles on the map that prevent the agent from passing through. Therefore, the action "move" of the agent needs to interact with the map information and an interaction result is calculated by the GPU. For example, the action "move" of the agent includes jumping over the obstacles or bypassing the obstacles and so on.

The static data (such as the map information) can be stored in the display memory 1121 (FIG. 8) in the GPU 1021, while the dynamic data is stored in another memory in the GPU 1021. In this embodiment, the another memory is, for example, a shared memory 92 and multiple local memories 93 shown in FIG. 9. During each thread performing parallel calculation as above, when the static data is required, the static data in the display memory 1121 is called, and the dynamic data in the shared memory 92 and multiple local memories 93 is updated. It can be understood that after each thread performs calculation, data is stored in the shared memory 92 and the corresponding local memory 93, and is used for updating the dynamic data therein.

The advantages of such data storage method of the present disclosure are as follows: The space of the display memory 1121 in the GPU 1021 is limited, when the static data is too large, and if the static data is not shared, the GPU 1021 is not able to undertake storage tasks for multiple pieces of static data. Since these grids share the static data, only one piece of static data needs to be stored, so that a requirement for space of the display memory 1121 in the GPU 1021 is reduced. The method of maintaining independent dynamic data on the basis of sharing the static data is used, so that the agent may further have computing resources to calculate the relationship with other agents, for example, to prevent clipping through of the agent, while the agent interacts with the game environment.

It can be understood that, in a process of simulating the game environment, the obtaining step S201 and the updating step S202 are repeatedly performed, and one or more initial parameters obtained each time for each agent and one or more subsequent parameters obtained by updating are stored as a historical parameter sequence for each agent.

For example, the historical parameter sequence includes $S_1^{t0}$ (including $loc_1^{t0}$, $HP_1^{t0}$ and other parameters obtained as above) of the agent1, $S_1^{t1}$ (including $loc_1^{t1}$, $HP_1^{t1}$ and other parameters obtained by updating as above), and subsequent $S_1^{t2}$ ... $S_1^{ti}$. $S_1^{ti}$ indicates one or more parameters of the agent1 at a time ti. It can be understood that the historical parameter sequence further includes $S_2^{ti}$ of the agent2 and $S_3^{ti}$ of the agent3. $S_2^{ti}$ indicates one or more parameters of the agent2 at a time ti, and $S_3^{ti}$ indicates one or more parameters of the agent3 at a time ti.

It can be understood that after one or more actions $A^{t0}$ at a time t0 are performed, $S_1^{t0}$ of the agent1 is changed to $S_1^{t1}$. Similarly, after one or more actions $A^{t1}$ at a time t1 are performed, $S_1^{t1}$ of the agent1 is changed to $S_1^{t2}$. Similarly, $S_1^{ti}$, $S_2^{ti}$, and $S_3^{ti}$ can be obtained.

It can be understood that the historical parameter sequence is stored in a playback service module (not shown in Figures) different from the server 100. In addition, it can be understood that, the actions performed by each agent at each time t are not saved.

The process of deriving an action according to the historical parameter sequence stored in the playback service module is described below in detail.

In the game, synchronization indicates that performance effects of multiple clients are required to be consistent. As in this embodiment, a character location, a shooting angle, and a shooting time that are displayed in the screens of n players participating in the game are exactly the same, and data of the client and data of the server are kept consistent. Synchronization is a network technology. There are two types of game synchronization technologies, one is state synchronization and the other is frame synchronization. A difference between the state synchronization and the frame synchronization is where combat core logic is stored. In this technical field, the combat core logic of the state synchronization is stored on the server, and the combat core logic of the frame synchronization is stored on the client (such as a mobile phone and a tablet computer).

Specific to communication between the client and the server, in a mode of the state synchronization, a function of the client is performance of the data of the server. For example, almost all parameters (such as a health point, an attack, a defense, an attack speed, and a magic value) of a character are transmitted from the server to the client. And when the parameters change, the server informs the client which parameters change in real time. The client cannot change these parameters, but displays the parameters that are transmitted from the server (although the values stored on the client can be changed to achieve performance effects, such as the unlimited health point, when a parameter of the health point stored on the server side is 0, it is necessary to determine that the game character is dead). In this embodiment, a certain character needs to perform a firing action, and a specific process is as follows: The client notifies the server that "I want to fire" according to a logical operation of the user or the agent. The server calculates the process of parameter change of the firing action performed by the character and notifies the client of parameter change information. The client creates a firing effect based on the parameter change information, and places the firing effect at a corresponding location in a game scene, and then a bullet flies in a direction of the action operation. The server determines, according to collision detection logic, that the bullet hits the enemy at a next time, and then notifies the client of the parameter change information of the hit enemy. The client displays the reduced health point of the hit enemy based on the parameter change information from the server and plays the hit effect at the same time.

From the above description of the game of state synchronization, it can be learned that the server stores parameter information of the character (agent) in different states during the gaming process, and does not store an action sequence of the character. Therefore, a character action cannot be obtained directly, and the action needs to be derived from the parameters in a previous state and the parameters in a next state.

In addition, in a game of frame synchronization, a communication process is relatively simple. The server only forwards an operation instruction without any logical processing. In addition, in the game of frame synchronization, the server stores historical action sequences of the character (agent) in the game, and therefore there is no need to derive the action sequence.

A process of deriving an action sequence in a game of state synchronization is described in detail below with reference to FIG. 4.

Figure 4:
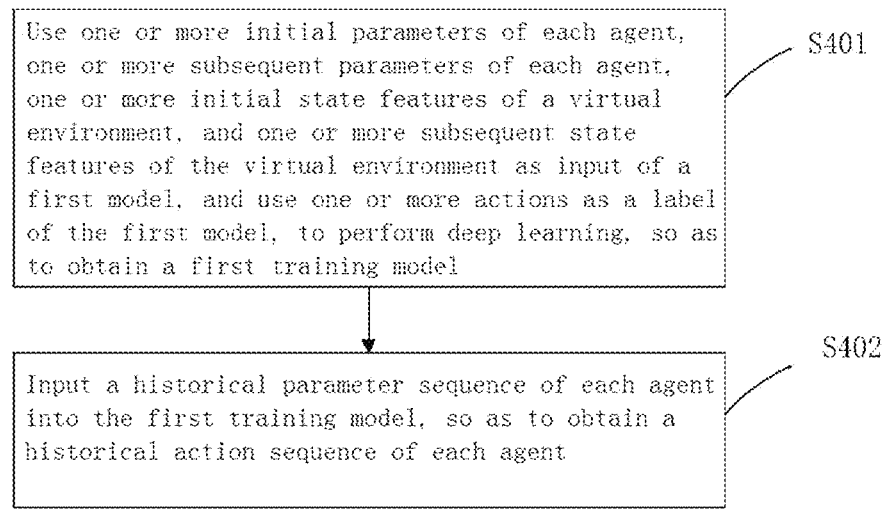
FIG. 4 is a flowchart of a method for deriving an action according to some embodiments of the present disclosure.

FIG. 4 is a flowchart of a method for deriving an action according to an embodiment of the present disclosure.

As shown in FIG. 4, in a first training step S401, the processor 102 in the server 100 uses the one or more initial parameters of each agent, the one or more subsequent parameters of each agent, the one or more initial state features of a game environment, and the one or more subsequent state features of the game environment as input of a first model, and uses the one or more actions as a label of the first model, to perform deep learning, so as to obtain a first training model.

It can be understood that, in the obtaining step S201, the processor 102 further obtains one or more initial state features $F^{t0}$ of the game environment, and in the updating step S202, one or more subsequent state features $F^{t1}$ of the game environment are further obtained by updating by using the GPU 1021.

It can be understood that the state features of the game environment are spatial features around each agent in the game environment, the duration of the game, the number of remaining players, the size and scope of the safe zone, and so on. It can be understood that the spatial features around an agent are represented by a voxelization world, which is a data structure. The method of obtaining the spatial features is recorded in Chinese patent applications 202111160564.8: 202111163612.9; 202111203126.5:202111203127.X: 202111160592.X. Details are not described herein.

It can be understood that the first model is, for example, a first neural network model, and the first neural network model is, for example, a fully-connected neural network, a recurrent neural network, and the like. For example, the initial parameters of the three agents and the one or more initial state features $F^{t0}$ of the game environment obtained in the obtaining step S201, and the subsequent parameters of the three agents obtained by updating in the updating step S202, and the one or more subsequent state features $F^{t1}$ of the game environment are used as input of the first neural network model, and those actions (for example, move1, fire2, aid3) obtained in the obtaining step S201 are used as a label of the first model, to perform deep learning, so that a first training model M1 is obtained. According to initial parameters and subsequent parameters of each agent, the first training model M1 can derive actions that cause the parameter change of the agent. It can be understood that the first training model M1 can be trained for multiple times.

In an action derivation step S402, the GPU 1021 inputs a historical parameter sequence of each agent into the first training model M1, so as to obtain a historical action sequence of each agent.

As mentioned above, the historical parameter sequence is stored in the playback server. When the historical action sequence needs to be derived according to the historical parameter sequence, the GPU 1021 performs the action derivation step S402.

Specifically, for example, a parameter $S_1^{t1}$ in a current state of the agent1 and a parameter $S_1^{t2}$ in a next state are input into the first training model M1, so that one or more actions $A^{t1}$ that make the parameter $S_1^{t1}$ in the current state change to the parameter $S_1^{t2}$ in the next state can be derived. Similarly, other actions performed at different times can be derived.

It can be understood that the historical parameter sequence may be a parameter sequence obtained in a large number of complete game sessions (that is, game environments).

Through the above derivation process, an action that causes a parameter variation (that is, an action of the game character) can be derived by using parameters in a current state and parameters in a next state without additional information, so that the agent of the game of state synchronization has historical actions, and communication overhead and delay for the server 100 to transmit additional information to the playback service module are reduced. It can be understood that, in the above method of deriving an action in this embodiment, the parameters in the current state and the parameters in the next state are input into the trained first training model M1 as described above (such as a fully-connected neural network and a recurrent neural network), so that the first trained model M1 outputs (derives) an action.

A process of further simulating a game environment in the game of state synchronization is described below in detail.

As shown in FIG. 5, in a second training step S501, the GPU 1021 uses one or more initial parameters of each agent, a corresponding action in the historical action sequence derived in step S402, and one or more initial state features of the game environment as input of a second model, and uses one or more subsequent parameters of each agent and one or more subsequent state features of the game environment as a label of the second model, to perform deep learning, so as to obtain a second training model.

It can be understood that the second model is, for example, a second neural network model, and the second neural network model is, for example, a fully-connected neural network and a recurrent neural network. For example, the GPU 1021 uses the parameter $S_1^{t0}$ in the current state of the agent1 obtained from the playback server as described above, one or more initial state features $F^{t0}$ of the game environment, and the action $A^{t1}$ derived from the above step S402 as input of the second neural network model, and uses the parameter $S_1^{t1}$ of the agent1 in the next state and one or more subsequent state features $F^{t1}$ of the game environment as a label of the second neural network model, to perform deep learning, so that a second training model M2 is obtained. It can be understood that the second training model M2 can be trained for multiple times.

It can be understood that the input of the second training model M2 is state features of the game environment at a current time, parameters of the agent and a current action, and the output is state features of the game environment at a next time and parameters of the agent.

It can be understood that a corresponding action in the historical action sequence is an action performed by each agent based on one or more initial parameters, such as an action $A^{t1}$ derived by using the above step S402.

It can be understood that the second training model M2 is a trained game environment model (that is, a deep learning model).

A process of further simulating the game environment in a game of frame synchronization is described below in detail.

As described above, the historical action sequence of the agent is not stored in the server of the game of state synchronization. Therefore, the first training model M1 is used to derive the historical action sequence. However, in the game of frame synchronization, the historical action sequence of the agent in the game is stored in the server. Therefore, the historical action sequence can be obtained directly, and there is no need to derive the historical action sequence.

Figure 6:
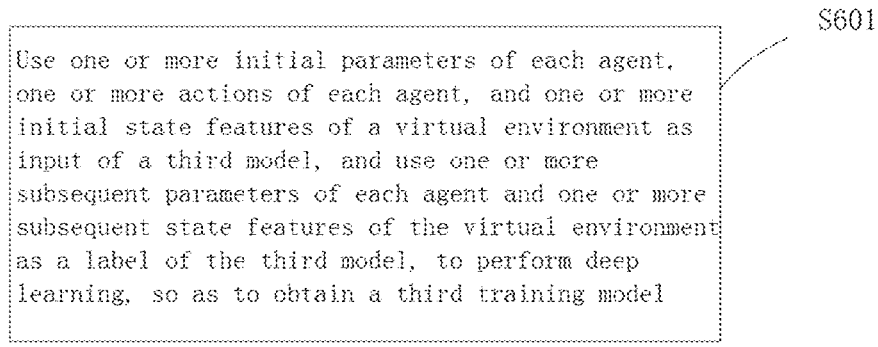
FIG. 6 is a flowchart of further simulating a game environment in a game of frame synchronization according to some embodiments of the present disclosure.

As described above, in the obtaining step S201, the processor 102 further obtains one or more initial state features $F^{t0}$ of the game environment, and in the updating step S202, the GPU 1021 further obtains one or more subsequent state features $F^{t1}$ of the game environment by updating. As shown in FIG. 6, in a third training step S601, the GPU 1021 uses one or more initial parameters of each agent, one or more actions of each agent (obtained directly), and the one or more initial state features of the game environment as input of a third model, and uses one or more subsequent parameters of each agent and the one or more subsequent state features of the game environment as a label of the third model, to perform deep learning, so as to obtain a third training model.

It can be understood that the third model is, for example, a third neural network model, and the third neural network model is, for example, a fully-connected neural network and a recurrent neural network. For example, the GPU 1021 uses the initial parameters $S_1^{t0}$ in the initial state of the agent1, one or more actions $A^{t0}$, and one or more initial state features $F^{t0}$ of the game environment as an input of the third training model, and uses the subsequent parameters $S_1^{t0}$ of the agent1 in a subsequent state and one or more subsequent state features $F^{t1}$ of the game environment as a label of the third training model, to perform deep learning, so that a third training model M3 is obtained. It can be understood that the third training model M3 can be trained for multiple times.

It can be understood that the third training model M3 is another well-trained game environment model (that is, a deep learning model).

It can be understood that the input of the third training model M3 is state features of the game environment at a current time, parameters of the agent, and a current action, and the output is state features of the game environment and parameters of the agent at a next time.

It can be understood that, in the above description, the parameters in the current state or the initial parameters indicate parameters at a current time before the action is performed, and the parameters in the next state or the subsequent parameters indicate parameters at a next time after the action is performed.

It can be understood that one or more agents can interact in the real game environment, the second training model M2 or the third training model M3.

Further, in the present disclosure, the agent can be enabled to perform the action (that is, perform interaction) in the second training model M2 or the third training model M3 (that is, the trained game environment model), and the action may not be performed in a real game environment. Therefore, when the agent is trained in the trained game environment model, a training speed of the agent can be improved.

When the agent is trained in a real game environment, the following problems are usually encountered: In the real game environment, parameters in various states need to be synchronized through the network, and the time required for the synchronization is affected by network parameters. The real game environment needs to provide players with higher playing experience. Therefore, an art processing step such as rendering a game screen is required, which is time-consuming.

The trained game environment model and the agent are deployed in the same server, and parameter interaction between the game environment and the agent is performed without the network, so that network transmission delay is avoided. The trained game environment model only focuses on the game state, parameters of the character, and actions of the character, and therefore, the time-consuming art processing steps such as rendering the game screen are avoided.

For the training process of the above first training model M1, the second training M2, and the third training model M3, the person skilled in the art can also choose to implement computations on the CPU provided that the calculation instruction and related I/O interface are modified according to the underlying interface provided by the operating environment.

In the above embodiment, the GPU 1021 in the processor 102 is used to implement the above method. It can be understood that, in other embodiments, a GPU integrated in a graphics card in the I/O device 112 may be used to implement the above method.

Figure 7:
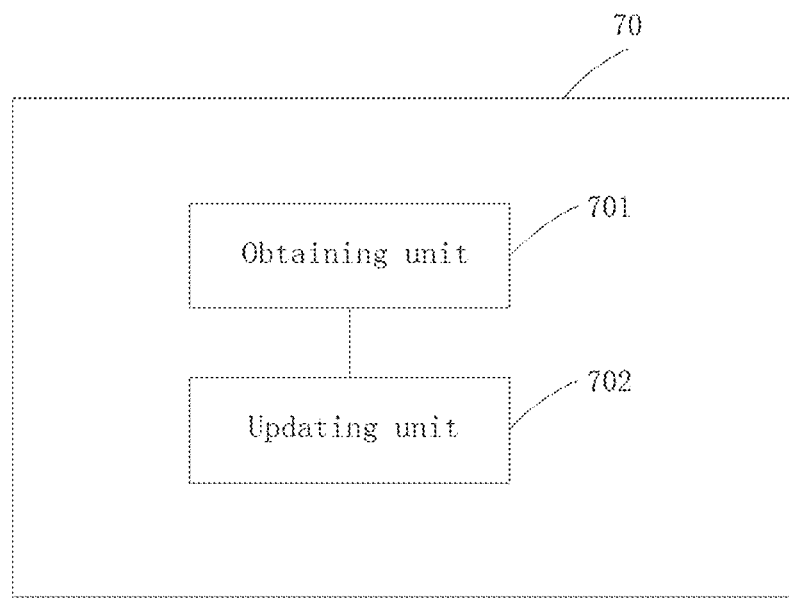
FIG. 7 is a structural diagram of an apparatus for training a model in a virtual environment according to some embodiments of the present disclosure.

The present disclosure further provides an apparatus for training a model in a virtual environment, and FIG. 7 is a structural diagram of an apparatus 70 for training a model in a virtual environment. As shown in FIG. 7, the apparatus 70 includes: an obtaining unit 707 configured to obtain one or more initial parameters of each of one or more agents in an initial state in the virtual environment, and cause each agent to generate one or more actions; and an updating unit 702 configured to cause each agent to perform one or more actions in the virtual environment, so as to calculate, for each agent, one or more parameter variations that are respectively in one-to-one correspondence with one or more initial parameters, and update, based on the one or more initial parameters and the one or more parameter variations, to obtain one or more subsequent parameters of each agent in a subsequent state in the virtual environment. It can be understood that the obtaining unit 701 and the updating unit 702 may be implemented by the processor 102 having functions of these modules or units in the electronic device 100. The previously disclosed implementations are method implementations corresponding to this implementation, and this implementation can be implemented in cooperation with the above implementations. The relevant technical details mentioned in the foregoing implementations are still valid in this implementation. In order to reduce repetition, details are not described herein. Correspondingly, the relevant technical details mentioned in this implementation may also be applied in the foregoing implementation.

The present disclosure further provides a computer program product, including a computer-executable instruction, and the instruction is executed by the processor 102 to implement the method for training a model in a virtual environment of the present disclosure. The previously disclosed implementations are method implementations corresponding to this implementation, and this implementation can be implemented in cooperation with the above implementations. The relevant technical details mentioned in the above implementations are still valid in this implementation. Details are not described herein in order to reduce repetition. Correspondingly, the relevant technical details mentioned in this implementation may also be applied in the above implementations.

The present disclosure further provides a computer-readable storage medium, on which an instruction is stored, and when the instruction is executed on a computer, the computer executes the method for training a model in a virtual environment of the present disclosure. The previously disclosed implementations are method implementations corresponding to this implementation, and this implementation can be implemented in cooperation with the above implementations. The relevant technical details mentioned in the above implementations are still valid in this implementation. Details are not described herein in order to reduce repetition. Correspondingly, the relevant technical details mentioned in this implementation may also be applied in the above implementations.

It should be noted that in the examples and the description of the disclosure, relative terms such as first and second are only used to distinguish one entity or operation from another entity or operation, and do not necessarily require or imply there is no such actual relationship or sequence between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element defined by "includes a . . . " does not, without more constraints, preclude the existence of additional identical elements in the process, method, article, or apparatus that includes the element.

Although the present disclosure has been shown and described with reference to certain preferred embodiments of the present disclosure, the person of ordinary skills in the art should understand that various changes in form and details may be made therein without departing from the spirit and scope of the application.

It should be noted that the sequence of the above embodiments of the present disclosure is only for description, and does not represent the advantages and disadvantages of the embodiments. The specific embodiments of this description are described above. Other implementations are within the scope of the appended claims. In some cases, the actions or steps recorded in the claims can be performed in a sequence different from that in the embodiments and still achieve desirable results. In addition, the processes depicted in the accompanying drawings do not necessarily require the particular order shown, or sequential order, to achieve desirable results. Multitasking and parallel processing are also possible or may be advantageous in certain embodiments.

It should be understood that in the above description of exemplary embodiments of the present disclosure, in order to streamline the present disclosure and to facilitate an understanding of one or more of the various inventive aspects, various features of the present disclosure are sometimes grouped together in a single embodiment, figure, or in its description. However, the method of this disclosure should not be interpreted as reflecting an intention that the protected present disclosure requires more features than the features that are expressly recorded in each claim. Rather, as the claims reflect, inventive aspects lie in less than all features of a single foregoing disclosed embodiment. Therefore, the claims following a specific implementation are hereby expressly incorporated into this specific implementation, and each claim itself serves as a separate embodiment of the present disclosure.

The person skilled in the art can understand that modules in a device in an embodiment can be adaptively changed and arranged in one or more devices different from the device in the embodiment. Modules or units or components in the embodiments may be combined into one module or unit or component, and furthermore may be divided into a plurality of sub-modules or sub-units or sub-components. Except a fact that at least some of these features and/or processes or units are mutually exclusive, all disclosed features and all processes or units of any method or device that are disclosed in such a way in this specification (including the appended claims, the abstract, and the accompanying drawings) may be combined in any combination mode. Unless otherwise explicitly stated, each feature disclosed in this specification (including the appended claims, the abstract, and the accompanying drawings) may be replaced by an alternative feature that serves same, equivalent, or similar purposes.

Furthermore, the person skilled in the art can understand that although some embodiments described herein include some features included in other embodiments but not others, combinations of features from different embodiments are meant to be within the scope of the present disclosure and form different embodiments. For example, in the claims, any one of the protected embodiments can be used in any combination.

We claim:

1. A method for training a model in a virtual environment, used for an electronic device, wherein the method comprising:

an obtaining step, obtaining one or more initial parameters of each of one or more agents in an initial state in the virtual environment, and causing each agent to generate one or more actions; and an updating step, causing each agent to perform the one or more actions in the virtual environment, so as to calculate, for each agent, one or more parameter variations that are respectively in one-to-one correspondence with the one or more initial parameters, and updating, based on the one or more initial parameters and the one or more parameter variations, to obtain one or more subsequent parameters of each agent in a subsequent state in the virtual environment, wherein the updating step is performed on a graphics processing unit, wherein, multiple threads are performed in parallel on the graphics processing unit, and each thread calculates a parameter variation and a subsequent parameter corresponding to each initial parameter, and wherein in the updating step, for each agent, after one or more actions associated with the same initial parameter are performed, a parameter variation corresponding to the same initial parameter is calculated.

2. The method according to claim 1, wherein for each agent, when a first initial parameter is associated with a second initial parameter, a parameter variation corresponding to the first initial parameter is calculated based on a parameter variation corresponding to the second initial parameter.

3. The method according to claim 1, wherein the one or more actions associated with the same initial parameter are actions performed by different agents.

4. The method according to claim 1, wherein one or more threads updating one or more initial parameters of the same agent form a thread block, each thread block is associated with a corresponding agent, and multiple thread blocks form a grid corresponding to the virtual environment, wherein, the same element content in multiple different virtual environments is stored as static data, and the one or more initial parameters and the one or more subsequent parameters of each agent are stored as dynamic data, and wherein, multiple different grids share the static data to be used by each thread in each grid.

5. The method according to claim 1, wherein the obtaining step and the updating step are repeatedly performed, one or more initial parameters of each agent obtained each time and one or more subsequent parameters obtained by updating are stored as a historical parameter sequence of each agent.

6. The method according to claim 5, wherein, in the obtaining step, one or more initial state features of the virtual environment are further obtained, and in the updating step, one or more subsequent state features of the virtual environment are further obtained by updating, wherein the method further comprising:
a first training step, using the one or more initial parameters of each agent, the one or more subsequent parameters of each agent, the one or more initial state features of the virtual environment, the one or more subsequent state features of the virtual environment as input of a first model, and using the one or more actions as a label of the first model, to perform deep learning, so as to obtain a first training model; and an action derivation step, inputting the historical parameter sequence of each agent into the first training model, so as to obtain a historical action sequence of each agent.

7. The method according to claim 6, wherein the method further comprising:
a second training step, using the one or more initial parameters of each agent, a corresponding action in the historical action sequence, the one or more initial state features of the virtual environment as input of a second model, and using the one or more subsequent parameters of each agent and the one or more subsequent state features of the virtual environment as a label of the second model, to perform deep learning, so as to obtain a second training model, wherein, the corresponding action is an action executed by each agent under the one or more initial parameters.

8. The method according to claim 7, wherein the one or more agents are caused to interact in the virtual environment or the second training model.

9. The method according to claim 1, wherein in the obtaining step, one or more initial state features of the virtual environment are further obtained, and in the updating step, one or more subsequent state features of the virtual environment are further obtained by updating, wherein, the method further comprising:
a third training step, using the one or more initial parameters of each agent, the one or more actions of each agent, and the one or more initial state features of the virtual environment as input of a third model, and using the one or more subsequent parameters of each agent and the one or more subsequent state features of the virtual environment as a label of the third model, to perform deep learning, so as to obtain a third training model.

10. The method according to claim 9, wherein the one or more agents are caused to interact in the virtual environment or the third training model.

11. The method according to claim 1, wherein the virtual environment is a game environment, and the one or more agents are corresponding to one or more game characters in the game environment.

12. A computer program product, comprising a computer-executable instruction, wherein the instruction is executed by a processor to implement the method for training a model in a virtual environment according to claim 1.

13. A non-transitory computer-readable storage medium having stored therein instructions configured to, when executed on a computer, cause the computer to perform the method for training a model in a virtual environment according to claim 1.

14. An electronic device, comprising:
one or more processors;
one or more memories;
wherein, one or more programs are stored in the one or more memories, and when the one or more programs are executed by the one or more processors, the electronic device is caused to perform the method for training a model in a virtual environment according to claim 1.

* * * * *